US011553796B2

United States Patent
Chang

(10) Patent No.: US 11,553,796 B2
(45) Date of Patent: Jan. 17, 2023

(54) SEAT RECLINER

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-Si (KR)

(*) Notice: Subject to any disclaimer, the term of this patent is extended or adjusted under 35 U.S.C. 154(b) by 0 days.

(21) Appl. No.: 17/369,243

(22) Filed: Jul. 7, 2021

(65) Prior Publication Data
US 2022/0015542 A1     Jan. 20, 2022

(30) Foreign Application Priority Data
Jul. 17, 2020   (KR) .......................... 10-2020-0088750

(51) Int. Cl.
*B60N 2/22*     (2006.01)
*B60N 2/225*    (2006.01)
*A47C 1/024*    (2006.01)
*B60N 2/235*    (2006.01)

(52) U.S. Cl.
CPC ............ *A47C 1/024* (2013.01); *B60N 2/2362* (2015.04)

(58) Field of Classification Search
CPC .................................................. B60N 2/2362
USPC ....................................................... 297/362
See application file for complete search history.

(56) References Cited

U.S. PATENT DOCUMENTS

| | | | | |
|---|---|---|---|---|
| 5,536,217 A * | 7/1996 | Droulon | ................... | B60N 2/85 297/362 X |
| 5,725,452 A * | 3/1998 | Droulon | ............... | B60N 2/2252 297/362 X |
| 7,497,519 B2 * | 3/2009 | Dill | ........................ | F16H 1/2836 297/362 X |
| 7,677,665 B2 * | 3/2010 | Eppert | ................. | B60N 2/2252 297/362 X |
| 7,753,450 B2 * | 7/2010 | Eppert | ................. | B60N 2/2252 297/362 X |
| 8,590,972 B2 * | 11/2013 | Jiang | .................... | B60N 2/2252 297/362 X |
| 9,096,152 B2 * | 8/2015 | Zynda | .................... | B60N 2/682 |
| 2013/0009439 A1 * | 1/2013 | Jokiel | .................. | B60N 2/2254 297/362 |
| 2013/0207434 A1 * | 8/2013 | Stilleke | ................ | B60N 2/2252 297/362 |
| 2013/0214578 A1 * | 8/2013 | Stilleke | ................. | B60N 2/225 297/362 |

(Continued)

FOREIGN PATENT DOCUMENTS

| | | |
|---|---|---|
| DE | 102012212144 A1 | 7/2013 |
| EP | 0628446 A1 | 12/1994 |
| EP | 1647438 A2 | 4/2006 |

(Continued)

OTHER PUBLICATIONS

Clement Vachey, "Extended European Search Report for EP Application No. 21185636.4", dated Dec. 10, 2021, EPO, Germany.

*Primary Examiner* — Rodney B White
(74) *Attorney, Agent, or Firm* — Novick, Kim & Lee PLLC; Jae Youn Kim

(57) ABSTRACT

Proposed is a seat retainer in which first outer teeth and first inner teeth or second outer teeth and second inner teeth are engaged with each other at an angle, thereby a gap between a gear plate and a first flange or between the gear plate and a second flange can be removed.

12 Claims, 10 Drawing Sheets

(56) References Cited

U.S. PATENT DOCUMENTS

2015/0306986 A1* 10/2015 Jarry .................... B60N 2/2252
297/362

FOREIGN PATENT DOCUMENTS

| JP | H0769108 A | 3/1995 |
| JP | 2007111128 A | 5/2007 |
| KR | 10-1284116 B1 | 7/2013 |

* cited by examiner

SEAT RECLINER

CROSS REFERENCE TO RELAYED APPLICATION

The present application claims priority to Korean Patent Application No. 10-2020-0088750, filed Jul. 17, 2020, the entire contents of which is incorporated herein for all purposes by this reference.

BACKGROUND OF THE INVENTION

Field of the Invention

The present invention relates to a seat recliner that solves the problem of vibration generated when a seat is reclined, can accurately and efficiently control a seat angle, and can provide high strength in comparison to existing recliners.

Description of the Related Art

A seat recliner is mounted on a seat in a vehicle, etc., and is used to adjust the angle of a seatback with respect to a seat cushion and achieve a stopping function as a specific angle.

In such a seat recliner, a first flange is fixed to a seat cushion and a second flange is fixed to a seatback, but this combination may be made in the opposite order. A gear plate is disposed between the first flange and the second flange. The gear plate achieves reduction by eccentrically engaging with the first flange or the second flange.

In this process, the gear plate rotates using an input rotational force and the first flange or the second flange eccentrically engaged with the gear plate rotates in a cycloid type, whereby the angle of a seatback is adjusted with reduction.

However, since a cycloid motion is generated with the gear plate and the flange eccentrically engaged with each other, fine vibration is generated when the angle of a seatback is adjusted, so there is a need for a solution for this problem.

The description provided above as a related art of the present invention is just for helping understanding the background of the present invention and should not be construed as being included in the related art known by those skilled in the art.

SUMMARY OF THE INVENTION

The present invention has been made in an effort to solve the problems described above and an objective of the present invention is to provide a seat recliner that solves the problem of vibration generated when a seat is reclined, can accurately and efficiently control a seat angle, and can provide high strength in comparison to existing recliners.

In order to achieve the objectives, a seat recliner according to the present invention includes: a first flange having first inner teeth formed along an inner surface thereof; a gear plate inserted in the first flange, having first outer teeth formed along an outer surface thereof and engaged with the first inner teeth, and having second outer teeth formed at a position offset in a height direction from the first outer teeth; a second flange combined with the first flange, covering an inside of the first flange, and having second inner teeth formed along an inner surface thereof and engaged with the second outer teeth; and an eccentric cam assembly disposed at a center of the gear plate, making the gear plate be eccentric with respect to the first flange and the second flange by pressing the gear plate to a side, wherein the first outer teeth and the second outer teeth are respectively engaged with the first inner teeth and the second inner teeth outside the eccentric cam assembly, in which the first outer teeth and the first inner teeth or the second outer teeth and the second inner teeth are engaged with each other at an angle, whereby a gap between the gear plate and the first flange or between the gear plate and the second flange is removed.

An engaging surface between the first outer tooth and the first inner teeth may be an inclined surface and the inclined surface may be formed upward toward the outside.

An engaging surface between the second outer tooth and the second inner tooth may be a vertical surface, and the gear plate may slide outward and upward along the inclined surface while the first outer teeth press the first inner teeth, whereby gaps between the second outer teeth and the second inner teeth may be removed.

Upper ends of points where the first outer teeth of the gear plate are formed to face lower end of the second flange with a predetermined gap therebetween, and when the gear plate slides outward and upward along the inclined surface, the ends of the points where the first outer teeth are formed may be supported by the lower end of the second flange.

A lower end edge of the second flange may be supported by upper ends of points where the first inner teeth of the first flange are formed.

The second outer teeth may be formed coaxially with the first outer teeth, and a diameter of a pitch circle of the second outer teeth may be smaller than a diameter of a pitch circle of the first outer teeth.

The second inner teeth may be formed coaxially with the first inner teeth, and a diameter of a pitch circle of the second inner teeth may be smaller than a diameter of a pitch circle of the first inner teeth.

A diameter of a pitch circle of the first outer teeth may be smaller than a diameter of a pitch circle of the first inner teeth and a diameter of a pitch circle of the second outer teeth may be smaller than a diameter of a pitch circle of the second inner teeth, so the gear plate may be engaged with the first flange and the second flange eccentrically to a side.

When a rotational force is applied to the gear plate, the gear plate may rotate the first flange and the second flange while rotating and revolving.

Any one of the first flange and the second flange may be fixed not to rotate and the other one may be rotated by the gear plate.

A side of the second flange may be inserted and fitted inside a wall of the first flange and a retainer may be combined outside a point where the first flange and the second flange are in contact with each other.

A fixing groove may be formed at an upper end of the point where the first flange and the second flange are in contact with each other, and the retainer may be inserted in the fixing groove.

An outer end of the retainer may be fixed with the first flange and the second flange may be supported by the retainer, so the first flange may be prevented from separating outward.

According to the seat recliner of the present invention, it is possible to solve the problem of vibration generated when a seat is reclined, accurately and efficiently control a seat angle, and provide high strength in comparison to existing recliners.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
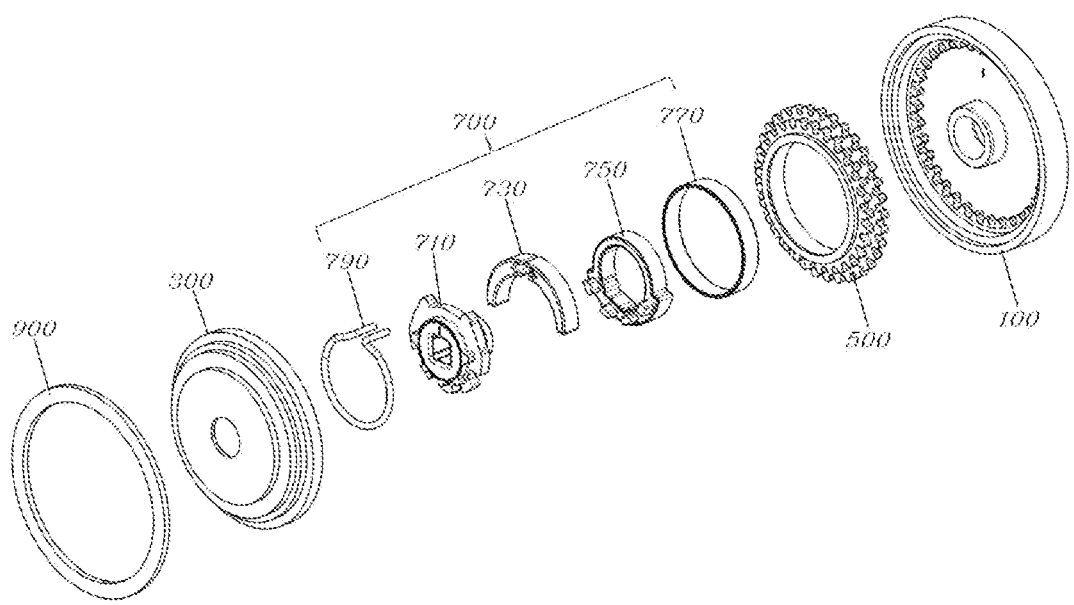
FIG. 1 is an exploded perspective view of a seat recliner according to an embodiment of the present invention.
Figure 2:
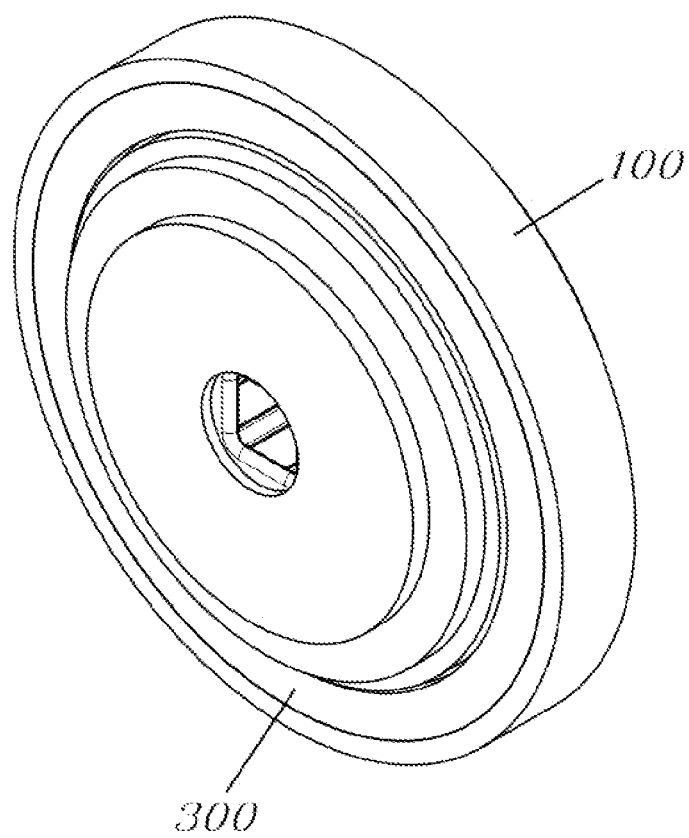
FIGS. 2 and 3 are perspective views of the seat recliner according to an embodiment of the present invention.
Figure 3:
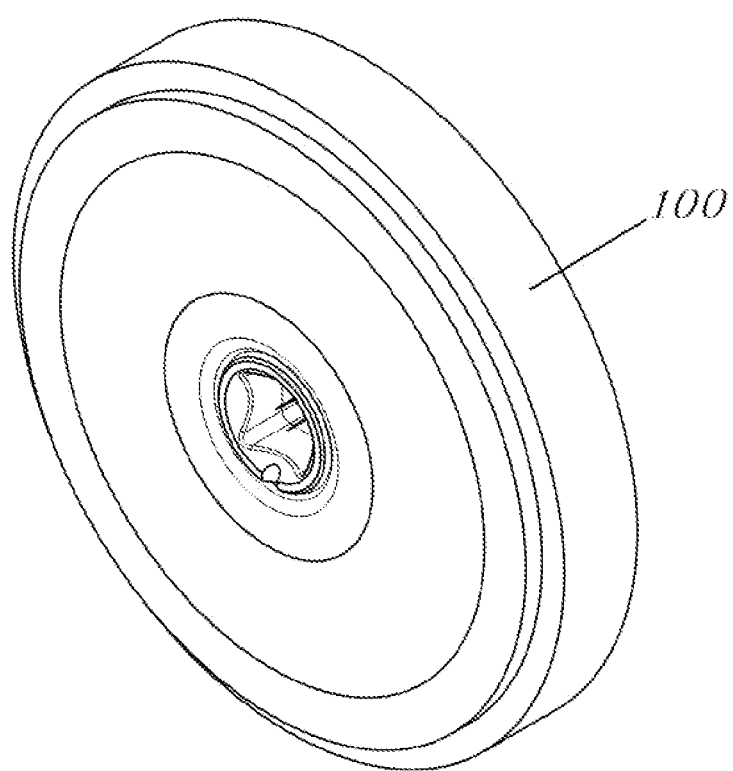
Figure 4:
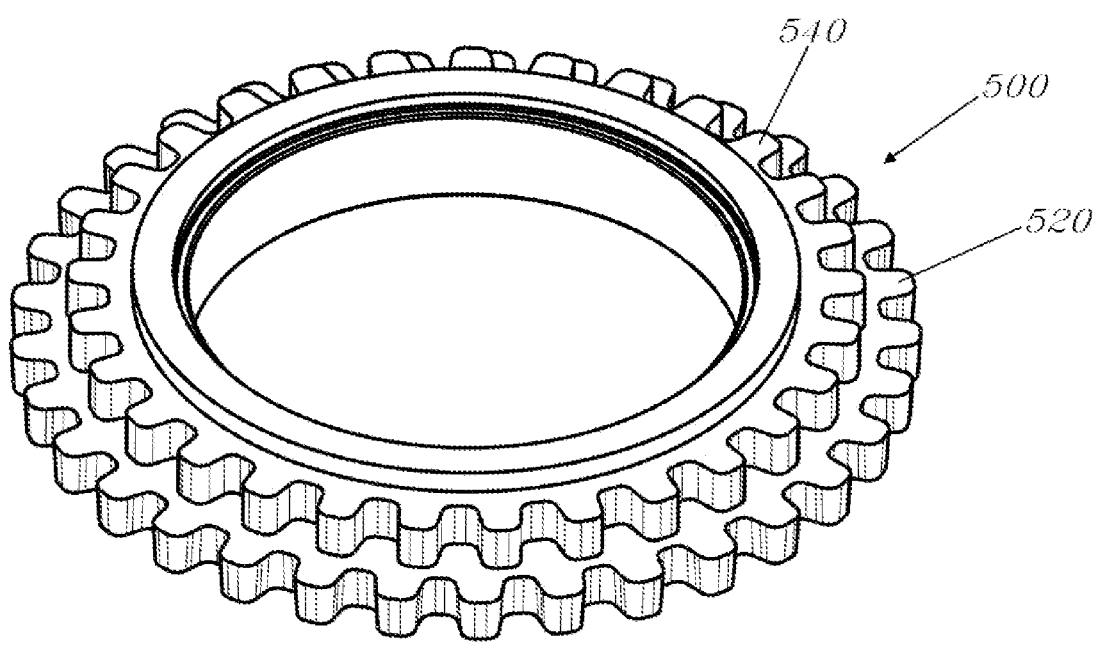
FIG. 4 is a view showing a gear plate of the seat recliner according to an embodiment of the present invention.
Figure 5:
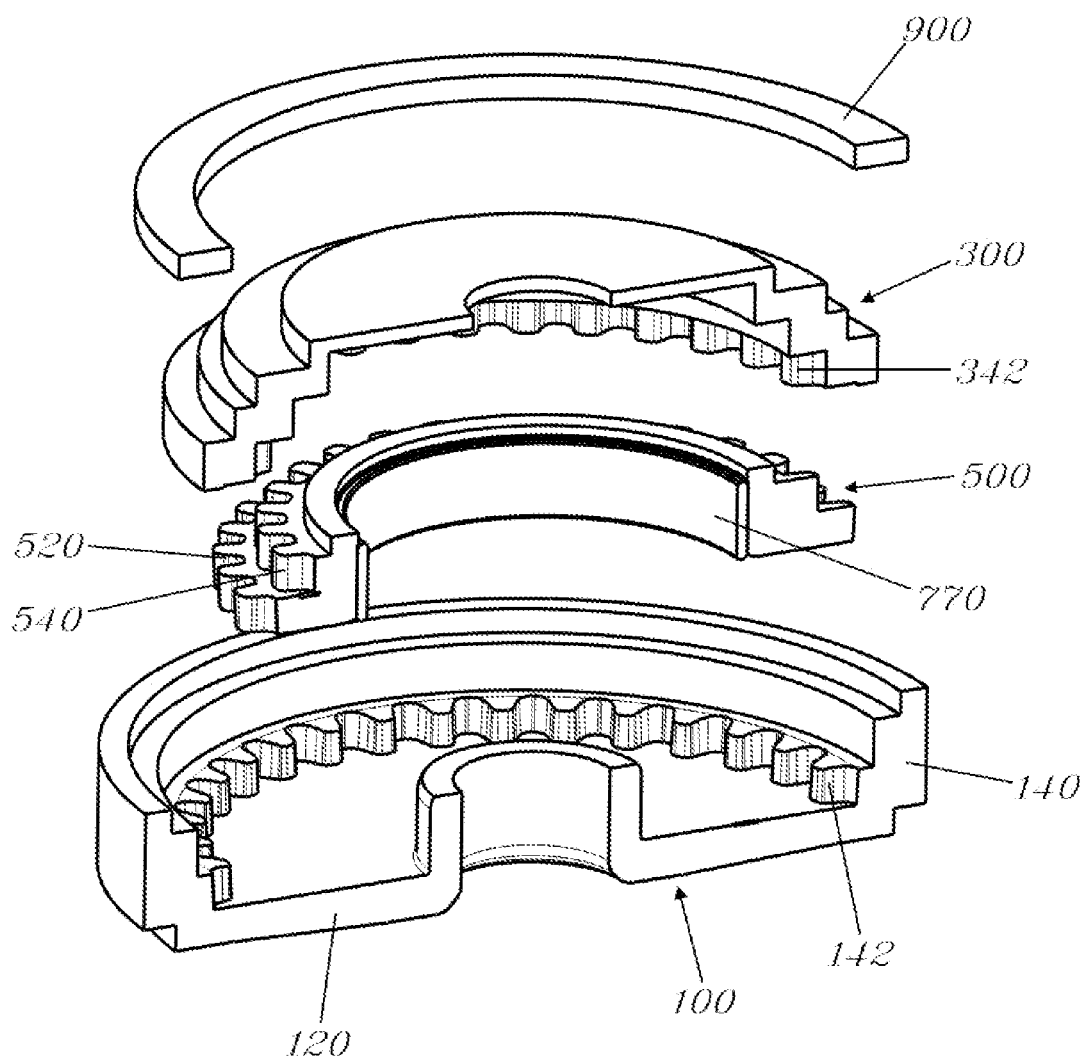
FIG. 5 is a cut view of the seat recliner according to an embodiment of the present invention.
Figure 6:
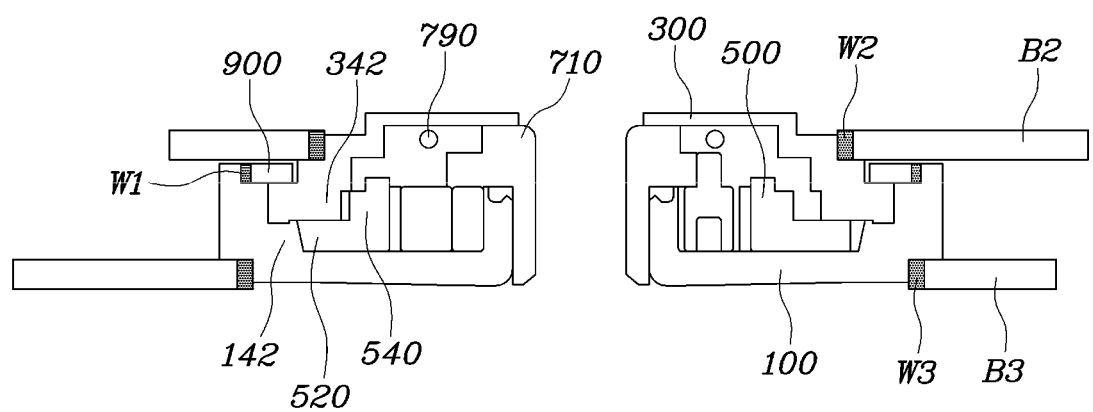
FIG. 6 is a cross-sectional view of the seat recliner according to an embodiment of the present invention.
Figure 7:
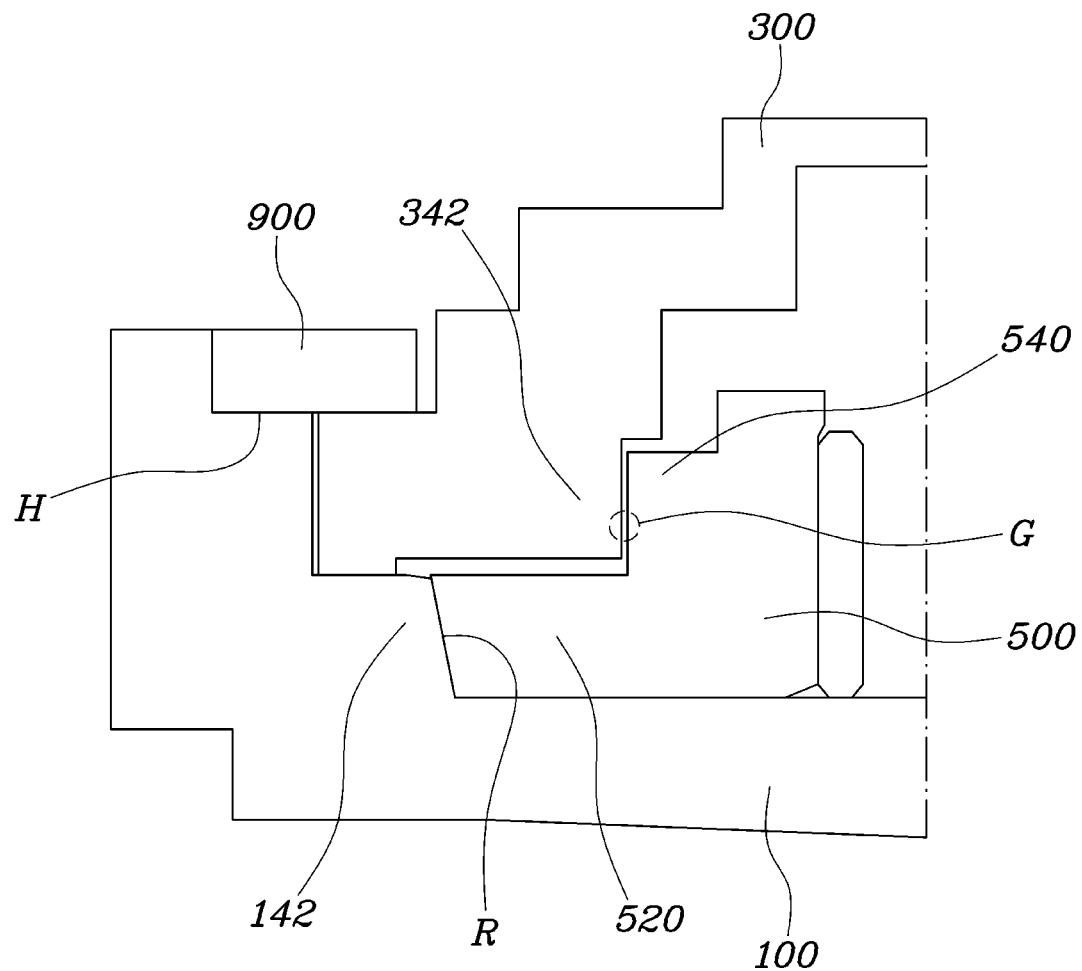
FIGS. 7 and 8 are views showing the state in which first outer teeth and first inner teeth of the seat recliner according to an embodiment of the present invention have been engaged with each other.
Figure 8:
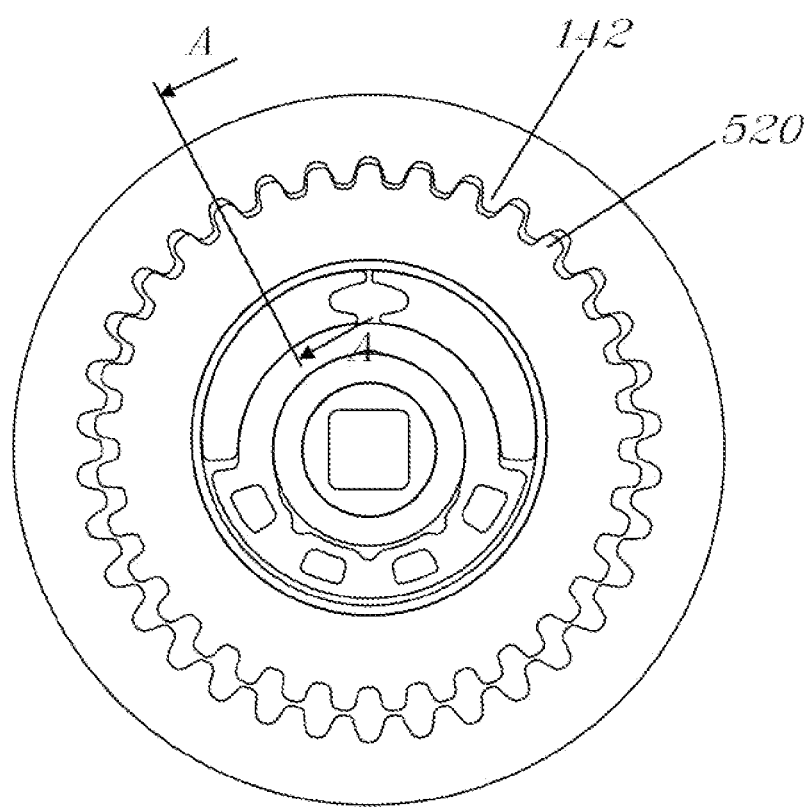
Figure 9:
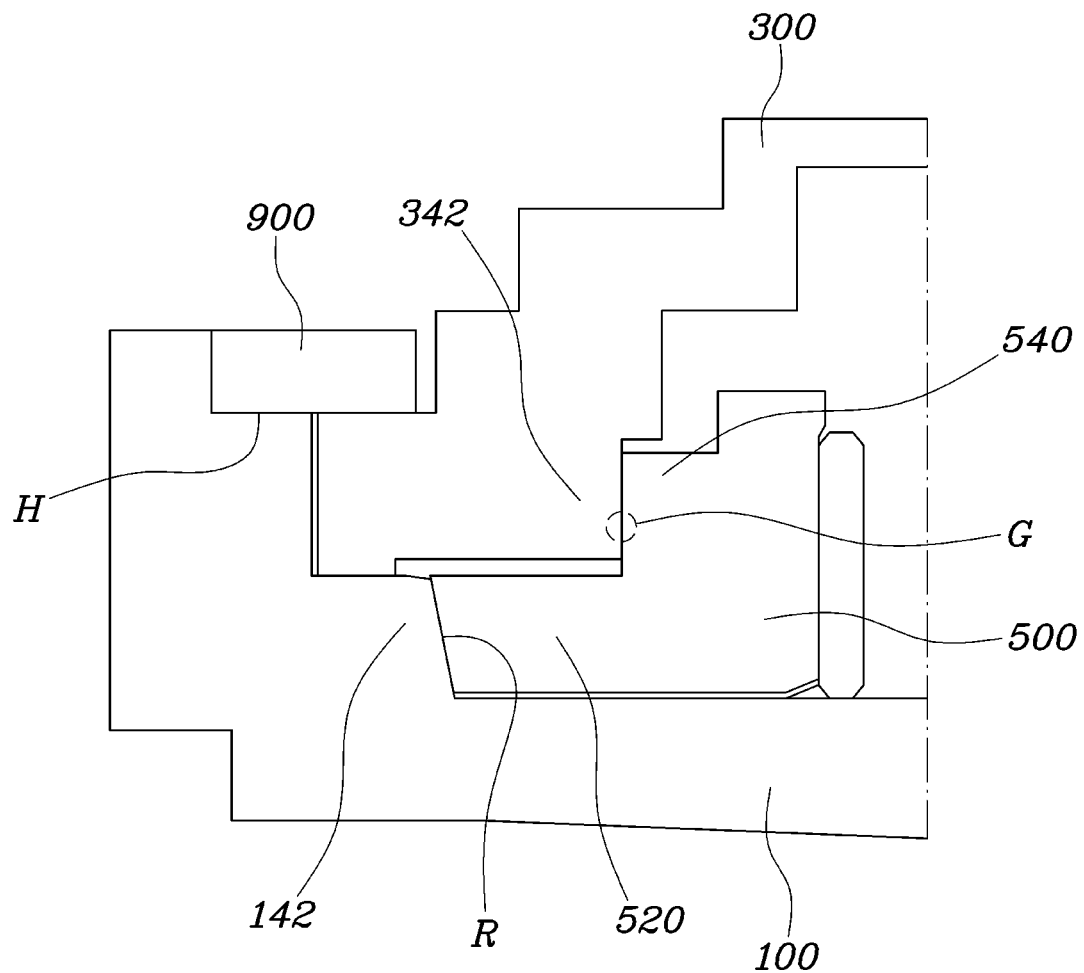
FIGS. 9 and 10 are views showing the state in which second outer teeth and second inner teeth of the seat recliner according to an embodiment of the present invention have been engaged with each other.
Figure 10:
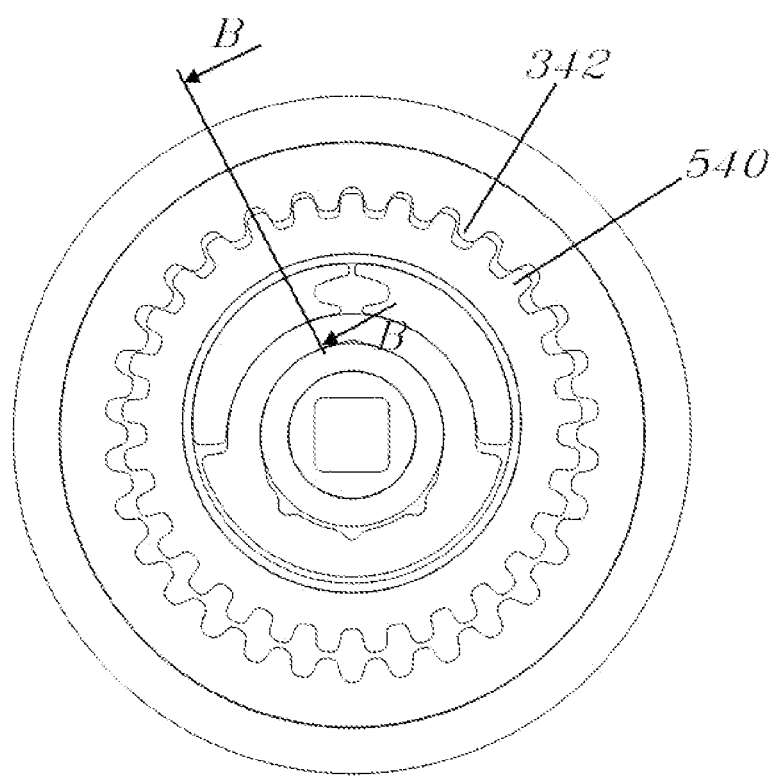

FIG. 1 is an exploded perspective view of a seat recliner according to an embodiment of the present invention, FIGS. 2 and 3 are perspective views of the seat recliner according to an embodiment of the present invention, FIG. 4 is a view showing a gear plate of the seat recliner according to an embodiment of the present invention, FIG. 5 is a cut view of the seat recliner according to an embodiment of the present invention, FIG. 6 is a cross-sectional view of the seat recliner according to an embodiment of the present invention, FIGS. 7 and 8 are views showing the state in which first outer teeth and first inner teeth of the seat recliner according to an embodiment of the present invention have been engaged with each other, and FIGS. 9 and 10 are views showing the state in which second outer teeth and second inner teeth of the seat recliner according to an embodiment of the present invention have been engaged with each other.

FIG. 1 is an exploded perspective view of a seat recliner according to an embodiment of the present invention. A seat recliner according to the present invention includes: a first flange 100 having first inner teeth 12 formed along the inner surface; a gear plate 500 inserted in the first flange 100, having first outer teeth 520 formed along the outer surface and engaged with the first inner teeth 142, and having second outer teeth 540 formed at a position offset in the height direction from the first outer teeth 520; a second flange 300 combined with the first flange 100, covering the inside of the first flange 100, and having second inner teeth 342 formed along the inner surface and engaged with the second outer teeth 540; and an eccentric cam assembly 700 disposed at the center of the gear plate 500, making the gear plate 500 be eccentric with respect to the first flange 100 and the second flange 300 by pressing the gear plate 500 to a side, and the first outer teeth 520 and the second outer teeth 540 are respectively engaged with the first inner teeth 142 and the second inner teeth 342 outside the eccentric cam assembly 700, in which the first outer teeth 520 and the first inner teeth 142 or the second outer teeth 540 and the second inner teeth 342 are engaged with each other at an angle, whereby the gap between the gear plate 500 and the first flange 100 or between the gear plate 500 and the second flange 300 can be removed.

According to the recliner of the present invention, the gear plate 500 is configured to have a gear set of two layers and the gears are engaged with each other at the first flange 100 and the second flange 300, whereby the flanges revolves based on concentricity rather than generating a cycloid motion based on eccentricity. Accordingly, when the reclining function is performed, vibration is not generated.

In detail, the seat recliner according to the present invention, in a broad meaning, includes the first flange 100 and the second flange 300. The first flange 100 and the second flange 300 are coupled to a seat cushion or a seatback and can rotate with respect to each other, so a seat can be reclined.

When the first flange 100 is coupled to a seat cushion, the second flange 300 is coupled to a seatback and rotates, whereby the seatback is reclined. When the second flange 300 is coupled to a seat cushion, the first flange 100 is coupled to a seatback and rotates with respect to the second flange, whereby the seatback is reclined.

FIG. 1 is an exploded perspective view of a seat recliner according to an embodiment of the present invention and FIG. 4 is a cut view. The inner teeth 142 are formed along the inner surface of the first flange 100. The first flange 100 is composed of a circular bottom 120 and a ring-shaped side 140 protruding upward along the edge of the bottom 120. The first inner teeth 142 are formed along the inner surface of the side 140, as shown in the figures.

The gear plate 500 is inserted inside the first flange 100. The first outer teeth 520 engaged with the first inner teeth 142 are formed along the outer surface of the gear plate 500 and the second outer teeth 540 are formed at a position offset in the height direction from the first outer teeth 520. The first outer teeth 520 of the gear plate 500 and the first inner teeth 142 of the first flange 100 are eccentrically engaged with each other at a side, whereby the first flange 100 rotates at the position when the gear plate 500 rotates or revolves.

The second flange 300 is combined with the first flange 100 and covers the inside of the first flange 100. The second inner teeth 342 engaged with the second inner teeth 540 of the gear plate 500 are formed along the inner surface of the second flange 300. The second inner teeth 342 of the second flange 300 are also eccentrically engaged with the second outer teeth 540 of the gear plate 500 at a side such that when the gear plate 500 rotates, the gear plate revolves too while being supported by the second flange 300.

That is, in an embodiment of the present invention, a rotational force from the outside is transmitted to the gear plate 500 by an input member 710, and when the gear plate 500 rotates, the gear plate 500 revolves too with respect to the second flange 300 of which the position is fixed such that rotation thereof is prevented. The first flange 100 rotates at the position by rotation and revolution of the gear plate 500. Accordingly, reduction is generated inside by eccentric combination, but the first flange 100 reclines a seatback coupled thereto while only rotating in terms of the outside. Accordingly, the first flange 100 does not generate a cycloid motion when reclining a seatback, and thus, there is no vibration.

Meanwhile, the recliner includes the eccentric cam assembly 700 therein that makes the gear plate 500 with the first be eccentric from the first flange 100 and the second flange 400 and engages the first outer teeth 520 and the second outer teeth 540 with the first inner teeth 142 and the second inner teeth 342 at a side by pressing the gear plate 500 to a side.

The eccentric cam assembly 700 is shown in FIG. 1. A space is formed at the center of the gear plate 500 and the input member 710 is disposed in the circular space, whereby a rotational force from the outside is transmitted. The input member 710 is combined and rotated with an eccentric ring 750. A pair of wedges 730 is coupled to a side of the edge of the eccentric ring 750. The wedges 730 are inserted in a bearing 770 and inserted in the gear plate 500 through the bearing 770. Accordingly, when the input member 710 is rotated, the eccentric ring 750 and the wedges 730 are rotated, and accordingly, the gear plate 500 disposed eccentrically from the input member 710 is rotated. When the gear plate 500 is eccentrically rotated, the second outer teeth 540 of the gear plate 500 are engaged with the second inner teeth 342 of the second flange 300. Accordingly, the gear plate 500 rotates and revolves and the flange 100 is correspondingly rotated, whereby reclining is achieved.

In particular, according to the present invention, the first outer teeth 540 and the first inner teeth 142 or the second outer teeth 540 and the second inner teeth 342 are engaged with each other at an angle, whereby the gap between the gear plate 500 and the first flange 100 or between the gear plate 500 and the second flange 300 can be removed.

FIGS. 7 and 8 are views showing the state in which the first outer teeth 520 and the first inner teeth 142 of the seat recliner according to an embodiment of the present invention have been engaged with each other and FIGS. 9 and 10 are views showing the state in which the second outer teeth 540 and the second inner teeth 342 of the seat recliner according to an embodiment of the present invention have been engaged with each other. An inclined surface R finely formed is shown in the figures.

FIG. 7 is a view showing the state cut along lien A-A of FIG. 8 and FIG. 9 is a view showing the state cut along line B-B of FIG. 10. The state in which a first outer tooth 520 and a first inner tooth 142 have been engaged with each other through the inclined surface R. Obviously, the inclined surface has been set on the second outer teeth and the first inner teeth shown in other figures, but it is a fine inclined surface, so it is not seen well. However, the structure of the fine inclined surface R can be seen from the enlarged drawings of FIGS. 7 and 9.

FIG. 7 shows the state in which the first outer tooth 520 is pressed to the first inner tooth 142 by rotation of the gear plate in an eccentric state and the gear plate 500 is slid slightly outward and upward by the inclined surface R when the teeth are engaged. The second outer tooth 540 of the gear plate 500 and the second inner teeth 342 of the second flange 300 are brought in close contact with each other, as shown in FIG. 9, by the fine sliding, so the fine gap G existing between the two gears is removed. Accordingly, the gap G that unavoidably exists for smooth operation and due to an error in the manufacturing process is immediately removed when the recliner is operated. Therefore, rattling is removed and it contributes to suppressing vibration.

In detail, the engaging surface between the first outer tooth 520 and the first inner teeth 142 is the inclined surface R and the inclined surface may be formed upward toward the outside. On the other hand, according to the embodiment shown in the figures, the engaging surface between the second outer tooth 540 and the second inner tooth 342 is a vertical surface, whereby the gap G is removed and the gear plate 500 is prevented from separating outside any more. By this action, the first outer tooth 520 presses the first inner tooth 142 and the gear plate 500 slides outward and upward along the inclined surface R, whereby the gap between the second outer tooth 540 and the second inner tooth 342 can be removed.

The upper end of the point where the first outer tooth 520 of the gear plate 500 is formed faces the lower end of the second flange 300 with a predetermined gap therebetween, and when the gear plate 500 slides outward and upward along the inclined surface R, the end of the point where the first outer tooth 520 is formed can be supported by the lower end of the second flange 300. That is, as shown in FIG. 7, a fine spacing is formed in the up-down direction between the first outer tooth 520 and the second inner tooth 342. The fine spacing is a space formed for ascending of the gear plate 500. When the gear plate 500 slides, the spacing is also removed, as shown in FIG. 9, whereby the gear plate 500 comes in close contact with the second flange 300. Accordingly, the gap and the spacing are removed, efficient transmission of power is achieved, and rattling or vibration is reduced.

The lower end edge of the second flange 300 may be supported by the upper ends of the points where the first inner teeth 142 of the first flange 100 are formed. Accordingly, the first flange 100 and the second flange 300 are assembled fundamentally in the state in which they are firmly supported by each other.

In order to achieve this principle, the second outer teeth 540 and the first outer teeth 520 are coaxially formed, and the diameter of the pitch circle of the second outer teeth 540 may be smaller than the diameter of the pitch circle of the first outer teeth 520. Further, the second inner teeth 342 are formed coaxially with the first inner teeth 142, and the diameter of the pitch circle of the second inner teeth 342 may be smaller than the diameter of the pitch circle of the first inner teeth 142.

Further, the diameter of the pitch circle of the first outer teeth 520 is smaller than the diameter of the pitch circle of the first inner teeth 142 and the diameter of the pitch circle of the second outer teeth 540 is smaller than the diameter of the pitch circle of the second inner teeth 342, so the gear plate 500 can be engaged with the first flange 100 and the second flange 300 eccentrically to a side. Accordingly, a rotational force is applied to the gear plate 500, the gear plate 500 can rotate the first flange 100 or the second flange 300 while rotating and revolving.

One of the first flange 100 and the second flange 300 may be fixed not to rotate and the other one may be rotated by the gear plate 500. The side of the second flange 300 is inserted inside the side of the first flange 100 to be fitted therein, and a retainer 900 may be combined outside the point where the first flange 100 and the second flange 300 are in contact with each other. In particular, a fixing groove H is formed at the upper end of the point where the first flange 100 and the second flange 300 are in contact with each other, and the retainer 900 may be inserted in the fixing groove H.

Accordingly, the outer end of the retainer 900, as shown in FIG. 5, is fixed with the first flange 100 by welding W1, and the second flange 300 is supported by the retainer 900, whereby the second flange 300 can be prevented from separating outside.

In this state, the first flange 100 and the second flange 300a re welded W2 and W3 by brackets B2 and B3, respectively, and the brackets B2 and B3 are fixed to a seat cushion and a seatback, respectively.

Meanwhile, the gear plate 500 of the present invention has gear teeth of two layers. Accordingly, the gear plate can be manufactured by cold fording rather than fine blanking and sufficient heights are secured for the teeth, so the strength of the entire recliner can be increased. Further, since coaxial rotation is generated rather than a cycloid motion, any one of the first flange and the second flange can be coupled to a seatback or a seat cushion.

According to the seat recliner of the present invention, it is possible to solve the problem of vibration generated when a seat is reclined, accurately and efficiently control a seat angle, and provide high strength in comparison to existing recliners.

Although the present invention was provided above in relation to specific embodiments shown in the drawings, it is apparent to those skilled in the art that the present invention may be changed and modified in various ways without departing from the scope of the present invention, which is described in the following claims.

What is claimed is:

1. A seat recliner comprising:
a first flange having first inner teeth formed along an inner surface thereof;
a gear plate inserted in the first flange, having first outer teeth formed along an outer surface thereof and engaged with the first inner teeth, and having second outer teeth formed at a position offset in a height direction from the first outer teeth;
a second flange combined with the first flange, covering an inside of the first flange, and having second inner teeth formed along an inner surface thereof and engaged with the second outer teeth; and
an eccentric cam assembly disposed at a center of the gear plate, making the gear plate be eccentric with respect to the first flange and the second flange by pressing the gear plate,
wherein the first outer teeth and the second outer teeth are respectively engaged with the first inner teeth and the second inner teeth outside the eccentric cam assembly,
wherein the first outer teeth and the first inner teeth or the second outer teeth and the second inner teeth are engaged with each other at an angle, thereby a gap between the gear plate and the first flange or between the gear plate and the second flange is removed, and
wherein an engaging surface between the first outer teeth and the first inner teeth is an inclined surface and the inclined surface is formed upward toward outside of the gear plate.

2. The seat recliner of claim 1, wherein an engaging surface between the second outer teeth and the second inner teeth is a vertical surface, the gear plate slides outward and upward along the inclined surface while the first outer teeth press the first inner teeth, thereby gaps between the second outer teeth and the second inner teeth are removed.

3. The seat recliner of claim 1, wherein upper ends of points where the first outer teeth of the gear plate are formed to face a lower end of the second flange with a predetermined gap therebetween, and when the gear plate slides outward and upward along the inclined surface, the upper ends of the points where the first outer teeth are formed are supported by the lower end of the second flange.

4. The seat recliner of claim 1, wherein a lower end edge of the second flange is supported by upper ends of points where the first inner teeth of the first flange are formed.

5. The seat recliner of claim 1, wherein the second outer teeth are formed coaxially with the first outer teeth, and a diameter of a pitch circle of the second outer teeth is smaller than a diameter of a pitch circle of the first outer teeth.

6. The seat recliner of claim 1, wherein the second inner teeth are formed coaxially with the first inner teeth, and a diameter of a pitch circle of the second inner teeth is smaller than a diameter of a pitch circle of the first inner teeth.

7. The seat recliner of claim 1, wherein a diameter of a pitch circle of the first outer teeth is smaller than a diameter of a pitch circle of the first inner teeth, and a diameter of a pitch circle of the second outer teeth is smaller than a diameter of a pitch circle of the second inner teeth, so the gear plate is eccentrically engaged with the first flange and the second flange.

8. The seat recliner of claim 1, wherein when a rotational force is applied to the gear plate, the gear plate rotates the first flange and the second flange while rotating and revolving.

9. The seat recliner of claim 8, wherein any one of the first flange and the second flange is fixed to prevent rotation and the other one is rotated by the gear plate.

10. The seat recliner of claim 1, wherein a side of the second flange is inserted and fitted inside a wall of the first flange and a retainer is combined outside a point where the first flange and the second flange are in contact with each other.

11. The seat recliner of claim 10, wherein a fixing groove is formed at an upper end of the point where the first flange and the second flange are in contact with each other, and the retainer is inserted in the fixing groove.

12. The seat recliner of claim 10, wherein an outer end of the retainer is fixed with the first flange and the second flange is supported by the retainer, such that the first flange is prevented from separating outward.

* * * * *